Oct. 18, 1960  I. KORN ET AL  2,956,915
THERMOPLASTIC LAMINATE FOR USE IN LINING STORAGE TANKS
Filed Feb. 17, 1955
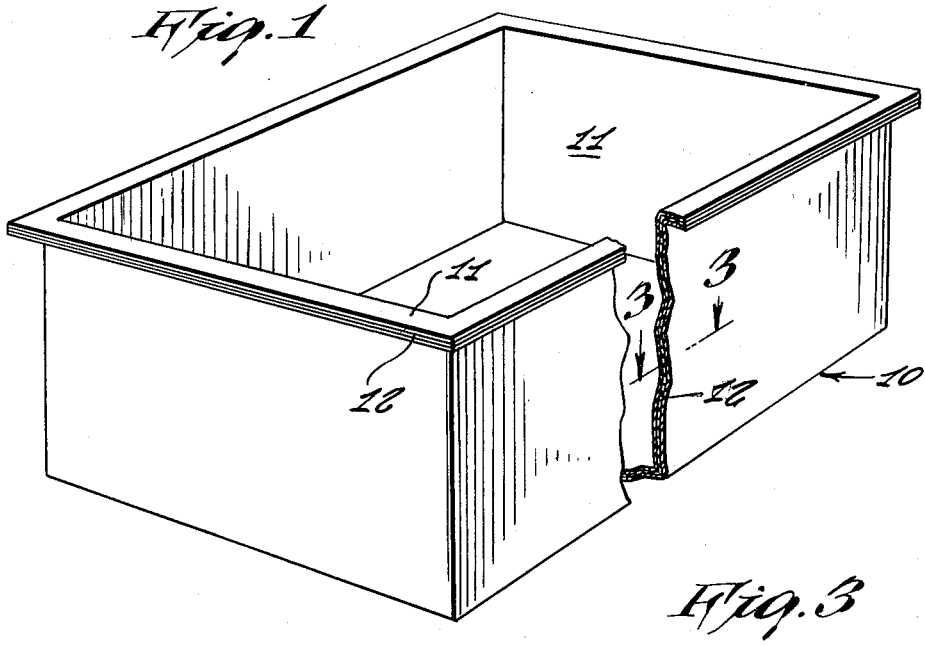
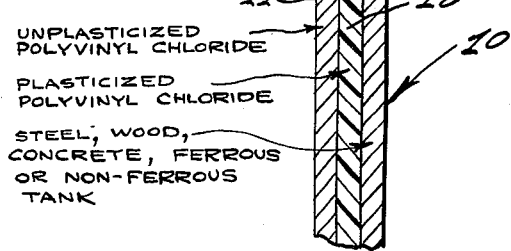
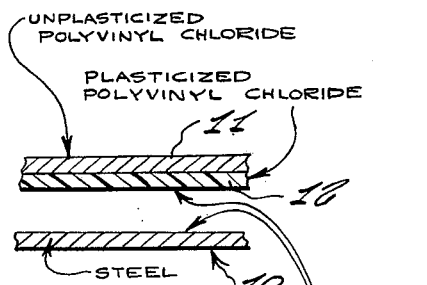
INVENTORS
IRVING KORN
JOSEPH S. KAYE
VERNON C. PIERCE
WILLIAM WALWORTH
JOSEPH HUSCHER
Carl Miller
ATTORNEY

2,956,915
THERMOPLASTIC LAMINATE FOR USE IN LINING STORAGE TANKS

Irving Korn, Great Neck, and Joseph S. Kaye, Brooklyn, N.Y., Vernon C. Pierce, Yardville, and William Walworth, Groveville, N.J., and Joseph Huscher, Philadelphia, Pa., assignors to Kaye-Tex Manufacturing Corp., New York, N.Y.

Filed Feb. 17, 1955, Ser. No. 488,916

1 Claim. (Cl. 154—43)

This invention relates to the lining of storage and/or process tanks and vessels for protection against corrosion and abrasion.

Chemical inertness to a broad line of chemical media, relatively high physical strength and hardness, and the ability to be joined by a variety of welding procedures employing a combination of moderate heat and pressure to achieve structural joints makes unplasticized polyvinyl chloride a material of great interest for handling corrosive media.

However, due to the fact that the physical properties, particularly tensile strength and flexural modulus, of unplasticized polyvinyl chloride are relatively small in comparison to steel, the construction of storage or process vessels with capacities in excess of about 50 cubic feet from unplasticized polyvinyl chloride requires the use of heavy plate thicknesses which makes these installations both uneconomical and impractical. On the other hand, the use of a relatively thin wall of unplasticized polyvinyl chloride for loose inserts as liners raises transportation problems as well as problems of expansion and contraction, which in unplasticized polyvinyl chloride is approximately five times that of steel. Another inherent disadvantage of unplasticized polyvinyl chloride as a liner resides in the fact that it is relatively sensitive when exposed to sudden or sharp impact. Furthermore, unplasticized polyvinyl chloride is difficult to bond to steel because of the inherent high chemical inertness of the material which restricts the selection of a cementing system and because of the considerable difference in the coefficient of expansion between the materials to be bonded.

It is accordingly a principal object of the present invention to provide a special thermoplastic laminate which consists of plasticized polyvinyl chloride superimposed on the unplasticized polyvinyl chloride to permit bonding to steel, concrete, wood and which provides a laminate embodying all the advantageous properties of unplasticized polyvinyl chloride while at the same time overcoming the above mentioned defects inherent therein.

It is another object of the present invention to provide a special thermoplastic laminate of the above type which is shock-resistant due to the cushion-like construction provided by the superimposed layers of plasticized polyvinyl chloride and unplasticized polyvinyl chloride.

It is still another object of the present invention to provide a special thermoplastic laminate of the above type which, in view of its semi-rigidity, can be preformed in standard sheet metal brakes or other forming equipment with, or without, heat, depending on the degree of deformation required.

For other objects and a better understanding of the invention, reference may be had to the following detailed description taken in connection with the accompanying drawing, in which:

Figure 1 is a perspective view of a tank shown partly in cross section and embodying the features of the present invention;

Fig. 2 is an enlarged cross sectional view showing the process of lamination, and Fig. 3 is an enlarged cross sectional view taken along the line 3—3 of Fig. 1.

Referring now more in detail to the drawing, 10 indicates generally a line storage or process tank or vessel which it is desired to protect against corrosion and abrasion. The tank 10 may be of any suitable material, for example steel, wood, concrete and ferrous or non-ferrous materials.

In the practice of the present invention, a special thermoplastic laminate comprising a layer 11 of unplasticized polyvinyl chloride and a layer 12 of plasticized polyvinyl chloride of a chemically resistant type is provided (Fig. 2) which is then bonded to the tank 10. Such a laminate has optimum chemical resistance, it has been discovered, as well as ability to be cemented to steel or welded. Such a laminate is relatively unsensitive to the coefficient of any expansion difference between the unplasticized polyvinyl chloride and steel and is shock-resistant due to the flexible type of cushion construction.

In applying the laminate to the tank, a primer coat is first applied to the adjacent surfaces of the tank 10 and the plasticized polyvinyl chloride 12. A bonding coat is then applied to these adjacent surfaces of the tank 10 and the plasticized polyvinyl chloride 12, allowing time for all coats to dry. The laminate is then applied to the tank (with the adjacent surfaces of the plasticized polyvinyl chloride 12 and tank 10 coming into contact, rolling out all air bubbles). Joints are made at all edges and corners and sealed with sealing strips or rods.

The resulting product is illustrated in Fig. 3.

The invention provides a laminate having complete chemical inertness to a broad line of chemical reagents, which inertness is inherent to unplasticized polyvinyl chloride. The laminate has the ability to be bonded to the supporting surfaces of the tank whether of steel, concrete or wood by means of the bond between the plasticized polyvinyl chloride phase of the laminate and the steel, concrete or wood tank while the unplasticized polyvinyl chloride portion of the laminate is exposed to the corrosive or abrasive media. Although the laminate is applied onto supporting surfaces as individual sheets or panels, a homogeneous lining offering uniform chemical resistance throughout the entire surface lined by heat welding or heat sealing of the various types of joints by employing the welding filler rod of an identical composition as the unplasticized polyvinyl chloride phase of the special laminate. A near homogeneous lining is achieved by the use of a welding filler rod or strip of composition similar to the unplasticized polyvinyl chloride phase of the special laminate.

While various changes may be made in the detail construction, it shall be understood that such changes shall be within the spirit and scope of the present invention as defined by the appended claim.

Having thus set forth and disclosed the nature of our invention, what is claimed is:

A special thermo-plastic laminate for the interior walls and floors of tanks for protection against corrosion and abrasion comprising an inner layer of unplasticized polyvinyl chloride and an integral outer layer of plasticized polyvinyl chloride bonded to the interior of the tank, a primer coat being provided on the adjacent faces of the tank and said plasticized polyvinyl chloride layer, and a bonding coat being applied over said primer coats.

References Cited in the file of this patent

UNITED STATES PATENTS

| | | |
|---|---|---|
| 1,367,231 | Boyer | Feb. 1, 1921 |
| 1,617,588 | Geer | Feb. 15, 1927 |
| 1,929,453 | Semon | Oct. 10, 1933 |
| 2,125,387 | Mason | Aug. 2, 1938 |
| 2,188,396 | Semon | Jan. 30, 1940 |
| 2,498,453 | Schaerer | Feb. 21, 1950 |
| 2,703,299 | Seymour et al. | Mar. 1, 1955 |
| 2,748,042 | Borgese | May 29, 1956 |